April 14, 1964 H. W. O'CONNOR 3,128,987
NON-LUBRICATED PLUG VALVE WITH PLASTIC LINER
Filed Oct. 2, 1962 3 Sheets-Sheet 1
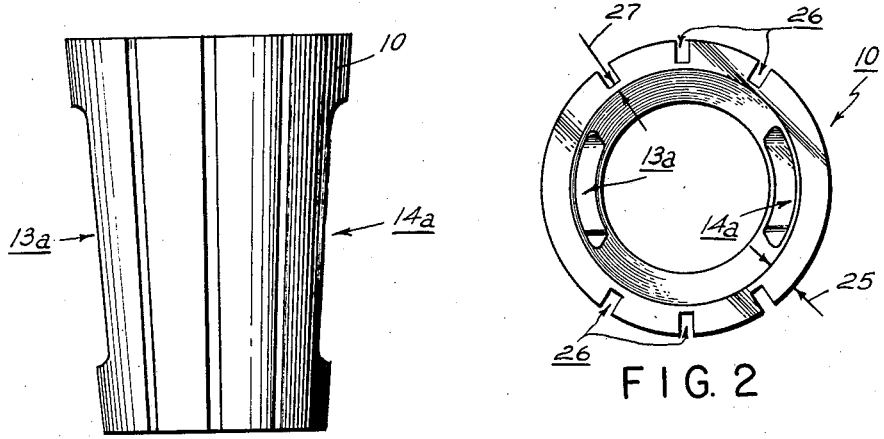
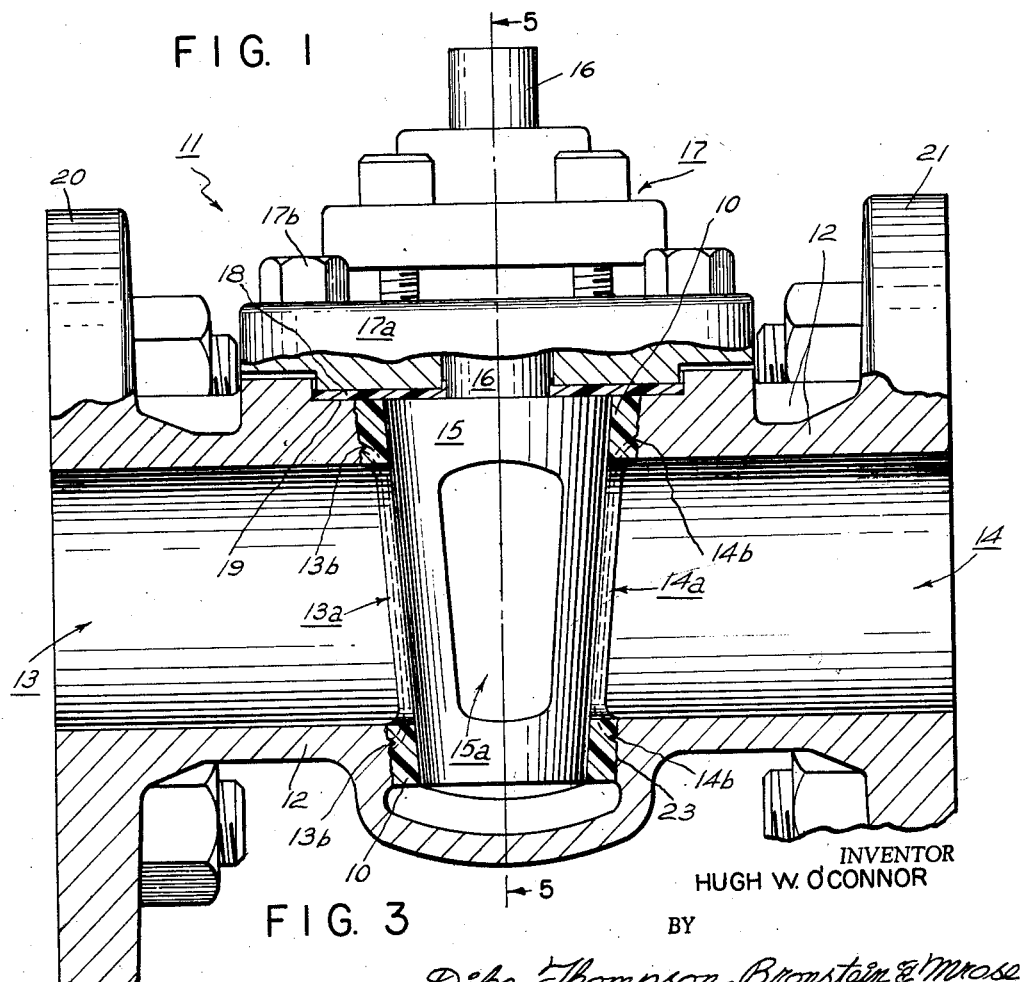
INVENTOR
HUGH W. O'CONNOR
BY
Dike, Thompson, Bronstein & Mrose
ATTORNEYS

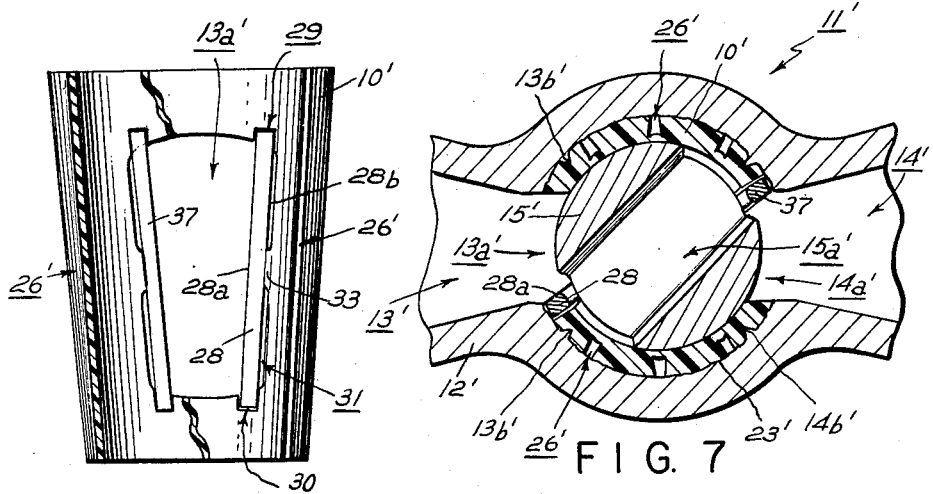

United States Patent Office 3,128,987
Patented Apr. 14, 1964

3,128,987
NON-LUBRICATED PLUG VALVE WITH
PLASTIC LINER
Hugh W. O'Connor, Wollaston, Mass., assignor to Walworth Company, New York, N.Y., a corporation of Massachusetts
Filed Oct. 2, 1962, Ser. No. 227,819
14 Claims. (Cl. 251—312)

The present invention relates to improvements in non-lubricated valves and, in one particular aspect, to novel and improved plug valves in which liners are uniquely shaped to be self-correcting for tight sealing and in which plastic flow and deformations about port openings are suppressed.

In its well known forms, the conventional plug valve includes a cylindrical or somewhat tapered valve or plug member having a flow passageway extending transversely in relation to its central longitudinal axis, the plug member being nested within a bore of generally complementary configuration in a valve body having fluid-flow ports disposed to be coupled or disconnected depending upon adjusted angular orientations of the plug member about its longitudinal axis. Valves of this type commonly must experience very high pressures and must yet remain easily adjustable, even after long periods between articulations. It has been found that lubricated designs, which permit the introduction of a flowable lubricant and sealant material between relatively rotatable ports, can provide good service in many applications, although such materials tend, in time, to be washed away or to become impure, such that the fluid line itself may become contaminated and the valve sealing and adjustability may become impaired and, in any event, further supplies of the material must be introduced periodically. Modernly, certain corrosion-resistant plastics possessing advantageously low coefficients of friction and high immunity to thermal deterioration are also exploited in valve structures wherein they serve both sealing and lubricating functions. The latter constructions may conveniently involve a thin sleeve or liner of the plastic material, secured to the movable plug member or the relatively stationary body; however, the preferred plastic materials, such as a polytetrafluoroethylene material, are not easily machined or otherwise formed within close tolerances, and even small dimensional discrepancies can result in leakage between the valve ports. Further, such materials are susceptible to serious cold flow under high pressure conditions, with attendant distortion and leakage. However, in accordance with the present teachings, the generally disadvantageous cold flow characteristics of the liner material are put to beneficial use in establishing optimum sealing within the valve and in avoiding the need for costly precision machining of certain valve and liner surfaces.

It is one of the objects of the present invention, therefore, to provide novel and improved non-lubricated plug valves of low-cost construction.

A further object is to provide improved valves of the type wherein a plastic liner is interposed between cooperating surfaces of a plug and body, the liner being uniquely shaped to adjust itself automatically in compensation for mismatching between relatively rotatable surfaces.

Another object is to provide improved sealing of non-lubricated valves containing liners of a polytetrafluoroethylene material, the liners being proportioned and specially relieved to achieve tight sealing between parts which are not precisely matched in dimensions, and the liners further being protected against cold flow and blow-out in the vicinity of valve ports.

By way of a summary account of practice of this invention in one of its aspects, the ported metal body of a plug valve is cast with a plug-accommodating bore having a slight conical taper, the exposed inner surfaces of the bore being left in the somewhat irregular "as cast" condition, or with but relatively rough machining. The bore is formed also with a narrow, but pronounced, integral endless metal ridge surrounding each of the port openings through the walls of the bore, the ridges being spaced from the edges of the ports and being in the "as cast" state. A hollow truncated conical liner formed of polytetrafluoroethylene is mated with the bore, with its transverse port openings aligned with the port openings through the walls of the bore in the body. Although the inner truncated conical surfaces of the hollow liner are continuous and smooth, for purposes of desired full seating and sealing with the exterior surfaces of a truncated conical metal plug member with which it is mated, the exterior of the liner is interrupted by a plurality of deep angularly-spaced longitudinal slots running from one axial end to the other on each side where they do not intersect the port openings. These spaced longitudinal slots are molded or cut radially deep, although they terminate short of the continuous inner surfaces of the liner by a relatively short distance sufficient to preserve the liner wall substantially stiff at all positions. When the plug member is forced firmly into the proper axial position within the liner, the liner is radially compressed between the precision-machined exterior of the plug member and the more roughly contoured bore walls of the valve body. Tensile and compressive stresses near the outer periphery of the liner are at least temporarily relieved by the longitudinal slotting, although the principal advantage of the slots is realized when cold flowing of the plastic causes various ones of these slots to be widened or closed, or both at different axial locations, as the radially-compressed liner material conforms with and accommodates itself to the imperfect contouring of the inner walls of the body bore. Locking of the liner material with the surface irregularities of the bore and with the inwardly-extending ridges about the body ports secures the liner in place, angularly, and inhibits cold flow of the liner material into the port areas.

Although the features of this invention which are believed to be novel are set forth in the appended claims, additional details as to preferred practices of the invention and as to the further objects and features thereof may be most readily comprehended through reference to the following description taken in connection with the accompanying drawings, wherein:

FIGURE 1 is a side view of a plastic valve liner constructed in accordance with these teachings;

FIGURE 2 is a pictorial view, from the top, of the same liner;

FIGURE 3 represents a partly-sectioned side view of an assembled valve incorporating the improvement features of this invention;

FIGURE 6 depicts an alternative liner construction, with a portion broken away to expose constructional detail, in association with a protective metal insert which suppresses liner blow-out under certain valve operating conditions;

FIGURE 7 is a cross-section of a portion of a valve, such as that of FIGURE 3, in which the liner and insert of FIGURE 6 are used;

Figure 4:
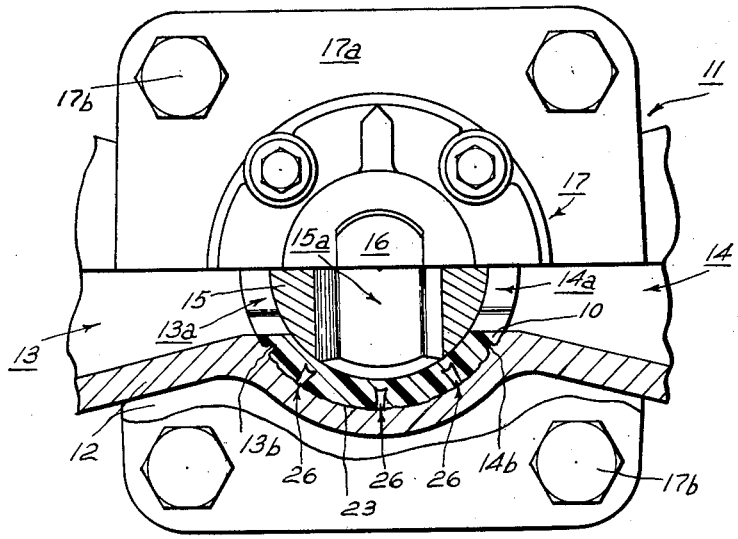
FIGURE 4 depicts in plan view a fragment of the valve of FIGURE 3, partly in cross section.

FIGURE 8 provides an enlarged detail of fragments of the plug, body, liner and insert of the FIGURE 7 valve, as an aid to understanding of the insert functions; and FIGURE 9 is a pictorial representation of an improved liner, illustrating advantageous cold flow effects of its use.

The valve liner 10 portrayed in different full views in FIGURES 1 and 2 is illustrated in assembled relationship with other parts of a more complete valve structure 11 in FIGURE 3. In the latter illustration, the hollow truncated-conical plastic liner appears in nested relationship with the metal valve body 12, within a central opening or bore of generally comparable configuration extending transversely to the longitudinal port passageways 13 and 14. A truncated conical metal plug member 15 is, in turn, mated firmly with the liner, the plug member having an integral stem 16 which projects outwardly of the valve body, beyond the adjustable cover assembly 17, for angular adjustment of the plug member about its longitudinal axis by a suitable wheel, tool or actuator. Cover flange 17a, which is adjustably secured to the valve body 12 in closing relationship to the plug opening by bolts 17b, is sealed in fluid-tight relationship with a diaphragm-type sealing member 18 which also engages and is tightly sealed with both the top of the plug 15 and the surrounding annular body surfaces 19. When flange 17a is bolted firmly in place, plug member 15 is thrust forcefully into the illustrated position and the liner 10 is thereby securely compressed between inner walls of the body opening and outer surfaces of the plug member. Common pipe-coupling flanges 20 and 21 complete the basic assembly, serving to connect the valve passageways 13 and 14 into a fluid line in which flow is to be controlled.

Figure 5:
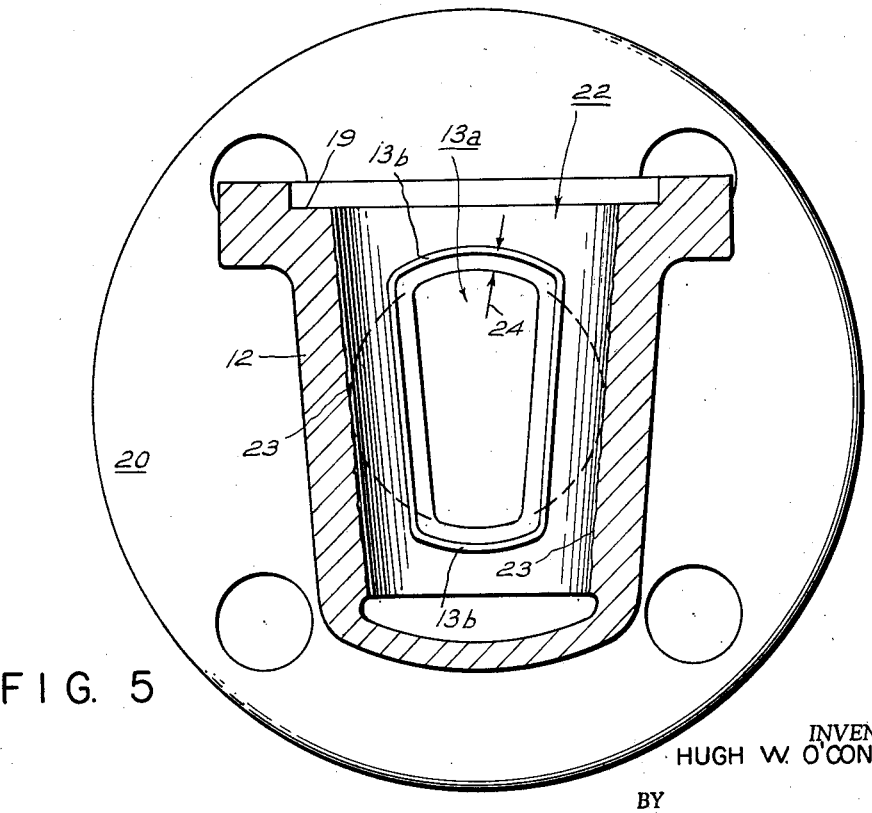
FIGURE 5 is a transverse cross section of the body casting of the valve of FIGURE 3, taken along section line 5—5 in that figure.

Plastic liner 10 is preferably formed of a tetrafluoroethylene polymer, which offers a desirably low coefficient of friction to the relative movements of the plug member surfaces and thereby admits of relatively low-torque turning of the plug 15 even though the plug surfaces are firmly pressed against the liner to preclude leakage. Although the use of plastic liners has been known before, these have been of constructions which have not solved serious problems associated with sealing, cold flow of the plastic material, and low-cost manufacture. Specifically, although tetrafluoroethylene polymers can be molded and machined, it is exceedingly difficult to produce a precision-tapered and accurately-sized truncated hollow conical liner which will fit closely both within a valve bore and about a tapered plug. Likewise, it involves great expense and exacting labor to machine a valve bore and plug of corresponding precision. When these requirements are not perfectly met, however, the liner is in various places excessively strained and stressed, and the resulting imperfect fits permit leakage or occasion cold flow. The latter effects can force the liner material into the port openings 13a and 14a where it will constitute an obstruction to flow between the body passageways 13 and 14 and through the transverse plug passageway 15a. In accordance with the present teachings, these difficulties are overcome by way of unique liner configurations and special contouring of the plug-receiving opening in the valve body. For these purposes, the valve body opening, 22 in FIGURE 5, is preferably left in the "as cast" condition after the body casting is formed. Such casting leaves relatively coarse or gross irregularities, to which the liner can conform without leaving leakage spaces. However, if machining is involved in producing the general conical taper desired, this machining preferably leaves the side walls 23 of the bore with a smooth finish of less than about 60 microinches, because a coarser machined finish tends to leave minute voids which will not be filled by the plastic material of the liner. In addition, endless raised ridges 13b and 14b, surrounding the respective body port openings 13a and 14a, are conveniently cast integrally with the valve body 12, these ridges being pronounced and narrow and being spaced from the port edges by a material distance 24 (FIGURE 5). As shown in FIGURES 3 and 4, these raised ridges are disposed to penetrate rather sharply into the liner 10 and thereby promote two advantageous locking effects: first, the liner is thereby more securely locked against angular movement when the plug member 15 is turned, and second, and more importantly, the rim of liner material enclosed between the ridges and the port openings is locked and isolated from peripheral stresses and strains in the liner which could otherwise cause unwanted cold flow of the plastic in the vicinity of the port openings.

The hollow liner 10 is of a truncated conical configuration and possesses a substantial wall thickness, 25 (FIGURE 2). On each side, laterally of the flow openings 13a and 14a therethrough, the exterior surfaces of the liner are interrupted by a plurality of angularly-spaced longitudinally-extending slots, 26, each of which is relatively narrow and radially deep. In one typical construction, a liner about 4½ inches in length and having an inner diameter of about 3 inches at the larger end is formed with a wall thickness of about $7/_{32}$ inch, and its six longitudinally-extending slots each possess generally rectangular cross-sections measuring $3/_{32}$ x $5/_{32}$ inch. The resulting thinnest wall thickness, corresponding to dimension 27 (FIGURE 2) is thus about $1/_{16}$ inch. The slots may be of somewhat different cross-sectional configuration, and the number may be different from that illustrated, although preferably at least two are formed on each side of the liner to insure that a desired peripheral flexibility and controlled cold flow can occur as intended. In very small valves a single slot can be used, on each side, although in every case the liner must be fully closed on its interior, i.e., the liner should not be cut through, because contaminants may then collect at such sites. All slots are disposed angularly beyond the reach of the ridges on the interior of the body openings, such that these slots cannot provide a leakage path between the ports and cavities within the valve body. The slots are preferably linear when formed by machining operations, but can perform effectively when made non-linear, also.

The slotted liner 10 is first assembled with the valve body, its flow ports being in registry with those of the body, at which time the relatively stiff liner seats on the inner surfaces of the opening 22 only imperfectly. Subsequently, the plug 15 is positioned within the liner and is then forced firmly into place by axial thrust exerted by the cover plate 17a as its bolts 17b are tightened. In this process, liner 10 is radially compressed between the smooth truncated-conical exterior surfaces of the plug and the relatively rough and irregular inner surfaces 23 of the body opening 22. Inwardly-projecting endless ridges 13b and 14b framing the ports 13a and 14a are immediately forced into the thick liner walls, and are effective to isolate the enclosed liner material from the very large stresses and strains which develop about the periphery of the liner as the compression increases. In the latter connection, it should be understood that the surfaces 23 of the valve body opening are not of precise contour and that it would involve great expense to match their proportions precisely with those of the mated plug 15; therefore the spaces between the plug and body surfaces; where the liner is interposed, are of irregular thickness and the liner material is thus more compressed in some discrete areas than in others. Moreover, while the exterior surfaces of plug 15 may be precision-machined, the taper of the interior of the liner 10 cannot be expected to be well matched to these surfaces unless costly manufacturing processes are exploited, and the liner may therefore be expected to be peripherally stretched and compressed from its relaxed state at various axial positions as the plug is forcibly driven into it and as it becomes more tightly seated within the body opening. Because of the effects of the longitudinal slots 26, the liner material is permitted to undergo the needed peripheral contractions, and expansions at localized positions, and, further, cold flow of this material under the great forces involved can take place at the sites of the slots. Consequently, the liner material orients itself in intimate engagement with all the exterior conical surfaces of the plug and with all interior surfaces of the body opening which are not directly opposite unclosed slots. Fluid-tight sealing is thereby produced over all essential areas, in a valve construction which entails only relatively low manufacturing cost. Such valves are commonly adjusted after a period of use, by tightening the bolts 17b and cover plate 17a, and the slotted liner 10 then once again is self-compensating, in similar fashion, for any mis-matching which may be encountered as the plug is driven further into the body opening. Irregularities in surface 23 of the body opening produce advantageous mechanical locking with the liner material once the liner is firmly compressed in place. Liner material framing the port openings is restrained from substantial peripheral cold flow by the encompassing endless ridges 13b and 14b, and does not distort so appreciably as to project into the port openings where it may impede fluid flow or be separated from the body walls by high-fluid pressures. The advantages are particularly pronounced in those instances where the valve must withstand a wide range of temperature fluctuations, i.e. rigorous heat-cycling, in which case the coefficient of expansion of the liner (example: Teflon) may be appreciably greater than that of the metal valve parts (example: steel), and the "cold" flow tends to be substantial. However, the liner slots accommodate the dimensional variations while the ridges hold the liner against flow into the ports.

The partial cross section of the valve appearing in FIGURE 4 reveals one type of plastic liner deformations which can occur, the longitudinal slots 26 there being distorted both along their inner and side walls as the result of peripheral compressions and ensuing cold flow of the liner material. It should be understood that at other positions within the same valve, the same slots may be enlarged, rather than reduced in cross section, as the result of peripheral expansions. In some instances the slots are nearly imperceptible because of the closures effected by cold flow. Throughout, the inner surfaces of the liner, in engagement with the conical plug surfaces, remain smooth and unwrinkled, as they should for optimum sealing purposes, even though cold flow may result in thinning or thickening of the walls near the bases of the longitudinal slots.

The cold flow characteristics of plastic liners, such as those of tetrafluoroethylene polymer material, are exploited to advantage in the valves under discussion. In certain applications, however, the material is exposed to fluid flow pressures which can have the effect of distorting and blowing parts of the thick liner material into the flow passageways, thereby impairing the sealing and articulations of the valve. Such applications are those which involve high line pressure, high-temperature cycling, and valve adjustments wherein the valve is cracked open only very slightly. Under these conditions, a liner edge at the site of a small opening between a body port and a plug passageway experiences enormous forces tending to dislodge and distort it. The modification depicted in FIGURES 6–9 achieves an important improvement in relation to these blow-out tendencies. For convenience in the following description, the valve and liner elements and features which are functionally the equivalents of those represented in FIGURES 1–5 are designated by the same reference characters, with distinguishing single-prime accents added. The Teflon, or equivalent, liner 10′ is provided with six longitudinal slots 26′, three disposed on each side of the port openings 13a′ and 14a′, beyond the reaches of the endless raised body ridges 13b′ and 14b′, and is further notched or slotted in the vicinity of one edge of at least one of its ports or flow openings to receive and hold a steel or other suitable metal bar, 28. The elongated port edge involved is that at which the flow passageway is last closed (or first opened) by the plug member 15′ as it is turned during actuations between closure and opening of the valve. As viewed in FIGURES 7 and 8, for example, the valve plug 15′ is being turned counterclockwise to effect closure, although in other constructions the valve may be arranged for actuation towards closure in the opposite angular direction and only the opposite elongated port edge would be involved. Notches 29 and 30 at the top and bottom, respectively, of the port 13a′, at the edge in question, are of rectangular shape and are aligned to accommodate the generally rectangular steel bar 28 and to orient an edge 28a of the bar at essentially the position which would be occupied by an elongated edge of the liner port in a construction which does not include the bar. The notches extend radially through the relatively thick liner, and the bar is retained in the desired operative position both by the notched liner and by its entrapment between the concentric inner body surface 23′ and the outer surfaces of the plug (FIGURE 7). For these purposes, the bar 28 is made longer than both the elongated liner port opening 13a′ and the elongated flow opening 15a′ through the plug 15′. However, the notches 29 and 30, and bar 28, do not extend longitudinally beyond the dimensions encompassed by the raised ridge 13b′, and, as shown in FIGURE 9, the imprint of body ridge 13b′ upon liner 10′ lies beyond the axial extremities of these notches. In addition, the liner 10′ is relieved at position 31 by a substantial amount, 32, nearer the elongated edge 28b position of the bar more removed from the port opening, i.e. opposite edge 28a. Preferably, at least one protrusion 33 of the liner at this location remains in approximate engagement with bar edge 28b, to assist in maintaining its proper position. The bar itself possesses a thickness 34 (FIGURE 8), in the radial direction relative to the central plug axis, which is less than the radial thickness 35 of the spaces between inner body surface 23′ and the exterior of plug 15′, such that the bar insert does not bind and does not score the plug, and, importantly, the difference 36 in these radial dimensions is significantly less than the thickness 32 of the relief space beside the bar 28. These relationships insure that the liner 10′ is adequately protected by the bar 28, as may be observed through reference to the enlarged fragmentary illustration in FIGURE 8. If the pressures to the left of plug portion 15′ are high, those to the right being lower, within its flow passageway, the high velocity of flow under the illustrated "cracked-open" condition will be readily withstood by the exposed edges of bar 28. Unless a costly tight seal were effected between the bar and liner 10′, the high pressures would nevertheless ordinarily tend to disturb the liner also. However, the relatively narrow radial space 36 between the bar 28 and body surface 23′ effects a high pressure drop in any flow of fluid behind the bar, and the larger relief space 32 between the bar and liner 10′ insures that the fluid pressures there will be at the lower pressure. Accordingly, the liner 10′ is not susceptible to blow-out under the most aggravated condition under discussion, and, at the same time, the protective construction involved is simple and inexpensive.

Preferably, the insert or bar 28 is formed of stainless steel and is thus unaffected by most corrosive influences. The liner provisions here described also insure that anti-corrosive protection is obtained, and that contaminants cannot accumulate to disturb sealing. Although a further bar insert, 37, is shown in FIGURES 6 and 7, and accommodating liner shaping appears in FIGURE 9, the added bar is of particular importance where the valve is designed to control flow in either, rather than one direction. In that event, its constructional features, and operation, are as described in relation to insert bar 28. The pictorial illustration of deformations of slots 26′ in FIGURE 9 characterize the spreading and contraction which may occur at various positions in a liner constructed in accordance with these teachings.

Although specific practices have been described and preferred embodiments have been illustrated and referred to, it should be appreciated that various changes, modifications and substitutions may be effected without departure from these teachings, and it is aimed in the appended claims to embrace all such variations as fall within the true spirit and scope of the invention.

What I claim as new and desire to secure by Letters Patent of the United States is:

1. A lined plug valve comprising a valve body having a plug-receiving opening therein communicating with flow ports in the surface thereof, plug member mounted on said body for rotation within said opening, said plug member being of lesser cross-section than said opening and having a flow passageway therethrough disposed for alignment with said ports, a hollow deformable plastic liner mounted between and occupying substantially all of the space between said surface of said body opening and the exterior surfaces of said plug member, said liner having ports therethrough in registration with said flow ports and having a plurality of slots in the exterior surfaces thereof, said slots being spaced from said ports and extending substantially from one to the opposite axial end of said liner and being of lesser depth than the thickness of said liner, and adjustable means for forcing said plug member axially into said body opening and liner to compress said liner into tight sealing engagement with said surfaces of said body opening.

2. A lined plug valve comprising a cast metal valve body having a plug-receiving opening cast therein in communication with flow ports in the surface thereof, said surface of said body opening being in a relatively roughened state, a metal plug member mounted on said body for rotation within said body opening, said plug member having a precision-finished exterior surface of lesser cross-section than said body opening and having a flow passageway therethrough disposed for alignment with said ports, a hollow deformable plastic liner of polytetrafluoroethylene mounted between and occupying substantially all the space between said roughened surface of said body opening and said precision-finished surface of said plug member, said liner having ports therethrough in registration with said flow ports and having a plurality of spaced slots in the exterior surfaces thereof between said ports, said slots extending substantially from one to the opposite axial end of said liner, and adjustable means for forcing said plug member axially into said body opening and liner to compress said liner into tight sealing engagement with said roughened surfaces of said body opening.

3. A lined plug valve comprising a metal valve body having a plug-receiving opening therein communicating with flow ports in the surface thereof, a truncated conical metal plug member mounted on said body for rotation within said opening, said plug member being of cross-sections less than those defined by surrounding surfaces of said opening and having a flow passageway therethrough disposed for alignment with said ports, a hollow deformable plastic liner mounted between and occupying substantially all of the space between said surface of said body opening and the exterior surfaces of said truncated conical plug member, said liner having ports therethrough in registration with said flow ports and having a plurality of slots in the exterior surfaces thereof, said slots being spaced from said ports and extending substantially from one to the opposite axial end of said liner and being of lesser depth than the thickness of said liner, the number and spacing and cross-sections of said slots being proportioned to accommodate peripheral expansions and contractions of said liner and cold flow of the liner material into and out of said slots in compensation for dimensional irregularities in said space and for differences in the expansions and contractions of said liner and metal valve ports during heat-cycling, and adjustable means for forcing said plug member axially into said liner to compress said liner into tight sealing engagement with said surfaces of said body opening.

4. A lined plug valve as set forth in claim 3 wherein said surface of said plug-receiving opening is of substantially truncated conical configuration, wherein the interior and exterior surfaces of said hollow liner are of substantially truncated conical configuration and the material thereof is a tetrafluoroethylene polymer, and wherein said spaced slots between said ports are substantially linear and are spaced apart angularly about the exterior of said liner by substantially the same angular amount.

5. A lined plug valve as set forth in claim 4 wherein said valve body comprises a cast metal body, said surfaces of said body opening being in a relatively rough condition substantially as cast.

6. A lined plug valve comprising a metal valve body having a plug-receiving opening therein communicating with flow ports in the surfaces thereof and having at least one substantially endless inwardly-projecting ridge on said surface integral with said body encompassing each of said ports in spaced relationship to the edges of said ports, a truncated conical metal plug member mounted on said body for rotation within said opening, said plug member being of cross-sections less than those defined by surrounding surfaces of said opening and having a flow passageway therethrough disposed for alignment with said ports, a hollow deformable plastic liner mounted between and occupying substantially all of the space between said surfaces of said body opening and the exterior surfaces of said truncated conical plug member, said liner having ports therethrough in registration with said flow ports and having a plurality of spaced slots in the exterior surfaces thereof between said ports, said spaced slots extending substantially from one to the opposite axial end of said liner and being of lesser depth than the thickness of said liner, the number and spacings and cross-sections of said slots being proportioned to accommodate peripheral expansions and contractions of said liner and cold flow of the liner material into and out of said slots in compensation for dimensional irregularities in said space and for differences in the expansions and contractions of said liner and metal valve parts during heat-cycling, said endless ridges being of radial thickness about the axis of rotation of said plug member which is less than the radial thickness of said liner and projecting into said liner to inhibit flow of the liner material into the area of the port encompassed by said endless ridge, and adjustable means for forcing said plug member axially into said liner to compress said liner into tight sealing engagement with said surfaces of said body opening and with said ridge.

7. A lined plug valve as set forth in claim 6 wherein said valve body comprises a cast metal body, said surfaces of said body opening and said integral ridge about each of said ports being in substantially the condition as cast, said ridge encompassing each of said ports being spaced from the edges of the port by a substantially uniform distance, and said slots being spaced from the ridges.

8. A lined plug valve comprising a metal valve body having a plug-receiving opening therein communicating with elongated flow ports in the surfaces thereof, a truncated conical metal plug member mounted on said body for angular adjustment within said opening and having an elongated flow passageway therethrough disposed for alignment with said elongated ports, said plug member being of cross-sections less than those defined by surrounding surfaces of said opening, a hollow deformable plastic liner mounted between and occupying substantially all of the space between said surfaces of said body opening and the exterior surfaces of said truncated conical plug member and having elongated openings therethrough substantially in registration with said flow ports, a metal bar of length in excess of the longer edge dimensions of one of said ports, said bar being disposed between said surfaces of said body opening and the exterior surfaces of said plug member substantially along the longer edge of said one of said ports at which the flow passageway of said plug member is first opened into and last closed in relation to said one of said ports during angular adjustment of said plug member, said liner being relieved near an elongated side of one of said openings to accommodate and hold said metal bar along said edge, said bar being of thickness in the radial direction about said plug member which is slightly less than said space between said body opening surfaces and plug member, whereby there is radial clearance between said bar and said surfaces, and adjustable means for forcing said plug member axially into said liner to compress said liner into tight sealing engagement with said surfaces of said body opening.

9. A lined plug valve as set forth in claim 8 wherein said liner is provided with a plurality of spaced slots in the exterior surfaces thereof between said elongated openings, said spaced slots extending substantially from one to the opposite axial end of said liner and being of lesser depth than the thickness of said liner, the number and spacings and cross-sections of said slots being proportioned to accommodate peripheral expansions and contractions of said liner and flow of the liner material into and out of said slots in compensation for dimensional irregularities in said space and for differences in expansions and contractions of said liner and metal valve parts during heat-cycling.

10. A lined plug valve as set forth in claim 8 wherein said metal bar is of lesser length than the axial length of said liner, and wherein the relief in said liner comprises notches through said liner at opposite ends of said elongated side of said one of said openings disposed to receive and hold said bar along said edge, the ends of said bar being located in said notches.

11. A lined plug valve as set forth in claim 10 wherein the relief in said liner further comprises at least one narrow opening between said bar and the material of said liner adjacent said bar intermediate the sites of said notches, said narrow opening presenting greater cross-sectional area to flow of fluid therethrough than that of said radial clearance, whereby the material of said liner adjacent said bar is exposed to only relatively low pressures occasioned by relatively high pressure drops across said radial clearance.

12. A lined plug valve as set forth in claim 11 wherein the relief in said liner comprises at least two narrow openings between said bar and the material of said liner adjacent said bar, said openings being separated by a reinforced portion of said liner extending directly into engagement with said bar.

13. A lined plug valve as set forth in claim 10 wherein said plug-receiving opening has at least one substantially endless inwardly-projecting ridge on the surface thereof integral with said body and encompassing said one of said ports in spaced relationship to the edges of said one of said ports and encompassing said notches and said metal bar.

14. A lined plug valve as set forth in claim 11 wherein said liner material comprises a tetrafluoroethylene polymer and wherein the material of said metal bar is stainless steel.

References Cited in the file of this patent

UNITED STATES PATENTS

| | | |
|---|---|---|
| 2,728,550 | Sinkler | Dec. 27, 1955 |
| 2,911,187 | Owsley | Nov. 3, 1959 |
| 2,987,295 | Schenck | June 6, 1961 |
| 3,061,269 | Sinkler | Oct. 30, 1962 |